US011438028B2

(12) United States Patent
Becker et al.

(10) Patent No.: US 11,438,028 B2
(45) Date of Patent: *Sep. 6, 2022

(54) COMMUNICATION SET-UP FOR WIRELESS COMMUNICATION AND METHOD FOR CONTROLLING SUCH A COMMUNICATION SET-UP

(71) Applicant: Robert Bosch GmbH, Stuttgart (DE)

(72) Inventors: Rainer Becker, Esslingen (DE); Gerald Holtz, Stuttgart (DE); Stefan Ullmann, Korntal-Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/990,871

(22) Filed: Aug. 11, 2020

(65) Prior Publication Data

US 2020/0373967 A1 Nov. 26, 2020

Related U.S. Application Data

(63) Continuation of application No. 16/341,960, filed as application No. PCT/EP2017/077174 on Oct. 24, 2017, now Pat. No. 10,771,111.

(30) Foreign Application Priority Data

Oct. 24, 2016 (DE) .......................... 102016220866.7

(51) Int. Cl.
*H04B 5/00* (2006.01)
*H04W 12/40* (2021.01)
*H04W 76/14* (2018.01)
*H04L 9/40* (2022.01)
*H04W 12/06* (2021.01)

(52) U.S. Cl.
CPC ......... *H04B 5/0031* (2013.01); *H04B 5/0037* (2013.01); *H04B 5/0062* (2013.01);
(Continued)

(58) Field of Classification Search
CPC . H04W 12/06; H04W 12/004; H04M 1/7253; H04B 5/0037; H04B 5/0031;
(Continued)

(56) References Cited

U.S. PATENT DOCUMENTS

2012/0070158 A1* 3/2012 Allee ............... G06K 19/07766
375/259
2013/0027786 A1 1/2013 Kim et al.
(Continued)

FOREIGN PATENT DOCUMENTS

CN 1414516 A 4/2003
CN 101171604 A 4/2008
(Continued)

OTHER PUBLICATIONS

International Search Report for PCT/EP2017/077174, dated Jan. 16, 2018.
(Continued)

*Primary Examiner* — Thanh G Le
(74) *Attorney, Agent, or Firm* — Norton Rose Fulbright US LLP; Gerard Messina

(57) ABSTRACT

A communication set-up having an electronic circuit; the circuit including at least one communication unit for wireless communication. The communication unit includes an antenna network connected to an antenna; and also includes an actuating unit. The circuit of the communication set-up further includes a signal processing unit, and in response to operation of the actuating unit, the actuating unit is configured to release a signal to the signal processing unit, which, on the basis of this, converts the communication set-up from a blocked state to an enabled state, or vice versa. In addition, a method for controlling such a communication set-up is described.

32 Claims, 1 Drawing Sheet

(52) U.S. Cl.
CPC ...... *H04L 63/0853* (2013.01); *H04L 63/0861* (2013.01); *H04W 12/06* (2013.01); *H04W 12/40* (2021.01); *H04W 76/14* (2018.02)

(58) Field of Classification Search
CPC .............. H04B 5/0062; H04L 63/0853; H04L 63/0861; H04L 63/0428
See application file for complete search history.

(56) References Cited

U.S. PATENT DOCUMENTS

| | | |
|---|---|---|
| 2014/0197927 A1 | 7/2014 | Kwon |
| 2015/0295328 A1* | 10/2015 | Fireaizen ................. H01Q 3/12 |
| | | 342/370 |
| 2016/0241999 A1 | 8/2016 | Chin et al. |
| 2016/0294446 A1 | 10/2016 | Rumler et al. |
| 2017/0311160 A1 | 10/2017 | Feng et al. |
| 2018/0240284 A1* | 8/2018 | Droste .................... H04W 4/80 |

FOREIGN PATENT DOCUMENTS

| | | |
|---|---|---|
| CN | 201051267 Y | 4/2008 |
| CN | 204303007 U | 4/2015 |
| CN | 204349982 U | 5/2015 |
| CN | 205121610 U | 3/2016 |
| CN | 105868983 A | 8/2016 |
| DE | 10 2010 043 899 A1 | 5/2012 |
| DE | 10 2014 104 303 A1 | 11/2014 |
| JP | 2003150925 A | 5/2003 |
| JP | 2005222097 A | 8/2005 |
| JP | 2007134838 A | 5/2007 |
| JP | 2012209749 A | 10/2012 |
| JP | 2013515310 A | 5/2013 |
| WO | 2007057786 A2 | 5/2007 |

OTHER PUBLICATIONS

Canadian Office Action dated Apr. 26, 2021, issued in the related Canadian Application No. 3,041,053.

* cited by examiner

COMMUNICATION SET-UP FOR WIRELESS COMMUNICATION AND METHOD FOR CONTROLLING SUCH A COMMUNICATION SET-UP

CROSS-REFERENCE TO RELATED APPLICATIONS

The present application is a continuation application of U.S. patent application Ser. No. 16/341,960, filed Apr. 15, 2019, which is a U.S. National Phase of International Application PCT/EP2017/077174, filed Oct. 24, 2017, and claims the benefit under 35 U.S.C. § 119 of German Patent Application No. DE 10 2016 220 866.7, filed on Oct. 24, 2016, all of which are hereby incorporated by reference in their entireties.

FIELD

The present invention relates to a communication set-up for wireless communication, as well as to a method for controlling such a communication set-up.

BACKGROUND INFORMATION

Conventional communication set-ups typically include an electronic circuit, which has a communication unit for wireless communication. For this, an antenna network connected to an antenna is provided in the communication unit. Near field communication (NFC) is a possible technology for this.

Such communication set-ups are used in various fields of application. For example, communication set-ups for wireless communication are applied to cards usable as a means of payment, such as credit cards or bank cards, in order to initiate a payment event with the aid of wireless communication. To this end, the card wirelessly transmits necessary information, such as the card number, to the receiver unit, in this case, the payment terminal, via its communication unit, using, typically, NFC technology. The use of such a card with a contactless payment transaction is technologically simple and does not require any special technical knowledge, which means that its broad use in society is enabled.

However, in the case of contactless data and information transmission, there is always the risk of unauthorized persons' attaining access to the data. Thus, unauthorized persons may elicit the sensitive data unnoticed from the credit cards by imitating a payment terminal, using a receiver unit. The receiver unit may be, for instance, a smartphone having a corresponding app (application software), which brings the unauthorized person in the vicinity of someone else's credit card and keeps him/her there. If the card has transmitted its data to the smartphone one time, the unauthorized person may execute payments himself/herself or cause other harm to the credit card owner.

Different measures for increasing security in a contactless payment event have already been put forward. Thus, for example, a wireless communication device, which includes a transceiver circuit that is configured to communicate wirelessly with another device, is described in German Patent Application No. DE 10 2014 104 303 A1. In addition, the transceiver circuit is connected to a manipulation-proof circuit. The manipulation-proof circuit itself is also connected to a processor, which is configured to exchange data with the transceiver circuit via the manipulation-proof circuit. The manipulation-proof circuit may take the form of a subscriber identity module (SIM) or also a universal integrated circuit card. Any communication between the transceiver circuit and the processor is conducted via this manipulation-proof circuit, in order to prevent unauthorized use of the data.

In addition, a communication device, which includes a wireless communication interface for wireless communication, is described in German Patent Application No. DE 10 2010 043 899 A1; the wireless communication interface including an antenna network having a resonant antenna circuit. According to German Patent Application No. DE 10 2010 043 899 A1, a deactivation device is additionally provided, which is configured to change an electrical characteristic of the antenna network, in order to deactivate the wireless communication point. In this context, the electrical characteristic of the antenna network to be changed may be an inductance, a capacitance, a resistance, an impedance or a reactance. Thus, as a result, the resonant antenna circuit is detuned by operating the deactivation device, in order, therefore, to interfere with reception or emission of electromagnetic waves via the antenna, through which communication with the communication device may ultimately be prevented.

So, in German Patent Application No. DE 10 2010 043 899 A1, one of the electrical characteristics of the resonant antenna circuit itself is forcibly changed by use of the deactivation device. Since, by nature, the electronic detuning does not take place digitally, then, accordingly, the states "communication prevented" and "communication not prevented" are also not defined clearly.

Therefore, there is a need for a communication set-up, which may be converted reliably and securely from a clearly defined, blocked state to a likewise clearly defined, enabled state, and vice versa.

SUMMARY

The communication set-up of the present invention includes an electronic circuit, which has at least one communication unit for wireless communication. For its part, the communication unit includes an antenna network connected to an antenna. In addition, the communication set-up includes an actuating unit. According to the present invention, the circuit additionally includes, apart from the communication unit, a signal processing unit. In response to operation of the actuating unit, the actuating unit is configured to release a signal to the signal processing unit, which, on the basis of this, converts the communication set-up from a blocked state to an enabled state, or vice versa.

The embodiment of the communication set-up according to the present invention provides a communication set-up, which may be converted both reliably and securely from a blocked state to an enabled state, or vice versa. Herein, a blocked state is understood as a state, in which the option of wireless communication is deactivated at least partially. In response to conversion from such a blocked state to an enabled state, the previously deactivated option for wireless communication is activated. A blocked state may be generated, for example, by putting a unit in question into a "sleep mode." Upon conversion to an enabled state, the corresponding unit is "awoken." Alternatively, the relevant unit may be completely "switched off" in the blocked mode and "switched on" upon its conversion to enabled mode.

In this manner, in particular, the two states, blocked state and enabled state of the communication set-up, are each defined clearly and unequivocally. Since the present invention necessarily provides an actuating unit, which, in response to operating the same, is configured to initially release a signal, in any case, to a signal processing unit, which, based on the signal, then converts the communication set-up from a blocked state to an enabled state, or vice versa, it is not necessary to influence the antenna network itself, that is, to change an electrical characteristic of the antenna network in any case. Since it is made possible to convert the communication set-up from a blocked state to an enabled state, or vice versa, completely independently of the electrical characteristics of the antenna network, a change in an electrical characteristic of the antenna network may additionally occur due to the operation of the actuating unit, but does not have to.

Advantageous further refinements of the present invention are delineated in the dependent claims and described in the specification.

BRIEF DESCRIPTION OF THE DRAWINGS

Exemplary embodiments of the present invention are explained in greater detail with reference to the figures and to the description below.

DETAILED DESCRIPTION OF EXAMPLE EMBODIMENTS

Figure 1:
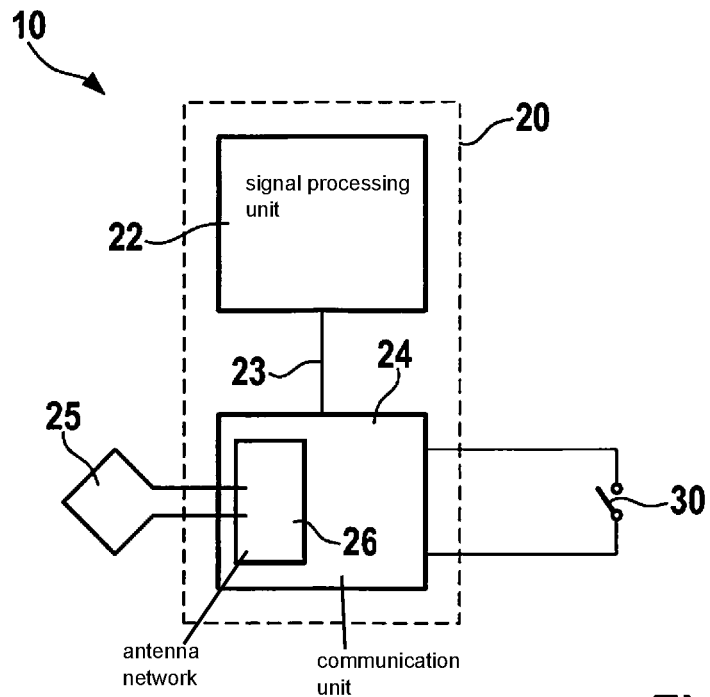
FIG. 1 shows a schematic representation of a first exemplary embodiment of the communication set-up according to the present invention.

A first exemplary embodiment of the communication set-up according to the present invention is explained with reference to FIG. 1. In general, the present invention provides a communication set-up 10 having an electronic circuit 20. Circuit 20 has at least one communication unit 24 for wireless communication; the communication unit 24 itself including an antenna network 26 connected to an antenna 25. Communication set-up 10 may communicate, via antenna 25, with an external unit not shown in the figure.

At this point, it is emphasized that in the present document, "communicate" and "communication" are not only understood to mean the transmission of data and/or information, but also the transmission of energy in general, for instance, the transmission of energy via coupling of an alternating magnetic and/or electromagnetic field between a transmitter unit and a receiver unit, typically, a transmitter coil and a receiver coil. Thus, the terms "communication unit 24" and "wireless communication" in the present document also encompass "power transmission unit" and "wireless power transmission," respectively. In this instance, the transmission of data or energy may take place both in only one direction and in two directions. In other words, in certain variants, communication set-up 10 may, in general, only receive or transmit data and/or energy. In other variants, however, communication set-ups 10 may also both receive and transmit data and/or energy.

Communication set-up 10 further includes an actuating unit 30. In addition, circuit 20 includes a signal processing unit 22. According to the present invention, in response to operation of actuating unit 30, actuating unit 30 is configured to release a signal to signal processing unit 22, which, on the basis of this, converts communication set-up 10 from a blocked state to an enabled state, or vice versa. Thus, a change of state of communication set-up 10 is brought about by operating the actuating unit 30. In this context, communication unit 24 of communication set-up 10 is preferably converted from a blocked state to an enabled state, or vice versa. It is also preferable for antenna network 26 of communication unit 24 to be converted from a blocked state to an enabled state, or vice versa.

In addition, in FIG. 1, the main region of circuit 20 is represented as a dashed line; individual component parts, for instance, a subsection of antenna 25 or a subsection of actuating unit 30, being depicted as protruding from the dashed-line region simply for reasons of graphical clarity.

In the first exemplary embodiment according to FIG. 1, communication set-up 10 is attached to a card usable as a means of payment, such as a credit card or a bank card. The card contains data and information worth protecting, such as a card owner and/or account number, in stored form, either in communication set-up 10 itself or in another region of the card. In order to be able to execute a contactless payment operation, using the card, this is brought into and held in the vicinity of a payment terminal. The payment terminal emits an electromagnetic field, by which the card having communication set-up 10 is supplied with energy. However, since the card is in a blocked state prior to the operation of actuating unit 22, the card or communication set-up 10 may not release any data. First and only by operation of actuating unit 30, is a signal released to signal processing unit 22, which, on the basis of this, converts communication set-up 10 from a blocked state to an enabled state. The card now transmits the data stored in the card, such as the account number, and the payment operation is executed.

In the first exemplary embodiment, on the basis of the signal released by actuating unit 30, signal processing unit 22 specifically converts communication unit 24 from a blocked state to an enabled state, through which, on the whole, communication set-up 10 experiences the change of state. Through this, the change of state is advantageously carried out in a selective manner in the unit of communication set-up 10, which is fundamentally responsible for the wireless communication. It is also preferable for signal processing unit 22 to be able to convert antenna network 26 of communication unit 24 from a blocked state to an enabled state. Thus, the entire antenna network 26 itself is converted from a deactivated state to an activated state.

In another specific embodiment, the card having the communication set-up 10 in the blocked state may even prevent the reception of external energy, in this case, emitted via the electromagnetic field of the payment terminal. Only by operation of actuating unit 30, is the card, i.e., communication set-up 10, converted to the enabled state, by which communication set-up 10 may actually receive the energy and the card may thus be supplied with energy.

In the specific embodiment of the present invention according to FIG. 1, in response to operation of actuating unit 30, actuating unit 30 is configured to release a signal to the signal processing unit without, in so doing, changing an electrical characteristic of antenna network 26. Therefore, in this specific embodiment, the option of additionally detuning an electrical characteristic of antenna network 26 is dispensed with. There is advantageously no gradual transition between the two states in the antenna network, which means that even in the antenna network itself, there is always a stable state.

Prior to operation of actuating unit 30, the card, that is, the communication set-up 10 mounted on it, is in a blocked state. Therefore, any flow of data remains blocked until actuating unit 30 is operated. Alternatively, there is also the possibility that in the blocked state of communication set-up 10, the flow of energy and/or data in the two directions of flow is only blocked to a limited extent. Thus, a distinction between sensitive and less sensitive data could be made in advance, so that in the blocked state, only the sensitive data are blocked, but not the less sensitive data. It is also conceivable, that even in the enabled state, only a predetermined set of data is released for data flow. In other words, highly sensitive data are always blocked and always remain blocked and are never released via wireless communication. Thus, even in the case of unblocking, highly sensitive data, such as personal data like the name of the card owner or the card validation code (CVC) of a credit card, are not transmitted, but only less sensitive data, such as the credit card number. The distinction between sensitive and less sensitive data, and consequently, between transmittable data and data always blocked, could be made in advance by the supplier of communication set-up 10, in this case, for example, by the provider of the credit card. Alternatively, or in addition, it could also be provided that the user of communication set-up 10 have the option of distinguishing between the data himself/herself. Thus, the user of the credit card could decide himself/herself, which information, for instance, purchase amount, time, location, goods purchased, he/she would like to release, and which under no circumstances.

Accordingly, in the blocked state, the flow of energy could only be blocked to a limited extent, that is, the flow of energy is not always blocked, but as of a particular upper limit. However, the specific embodiment, in which any flow of energy and/or data is blocked in the blocked state, is preferred. In addition, depending on demand, the blocking may take place in only one direction of flow; in particular, the blocking may only affect the flow out of communication set-up 10.

Correspondingly, in the enabled state, energy flow and/or data flow, preferably, any energy flow and/or data flow, is enabled at least to a limited extent in the two directions of flow, in particular, the flow out of communication set-up 10.

If communication set-up 10 is fundamentally suited to receive and/or transmit both energy and data, then, in the blocked state, only the energy flow may be blocked, but not the data flow. Inversely, in the blocked state, depending on demand, only the data flow may be blocked, but not the energy flow.

In the first exemplary embodiment of communication set-up 10, signal processing unit 22 and communication unit 24 are formed as separate units 22, 24 and interconnected by an electrical line 23. Alternatively, signal processing unit 22 and communication unit 24 may be configured as a common unit 22, 24 integrated with each other (not shown in the figures).

Figure 2:
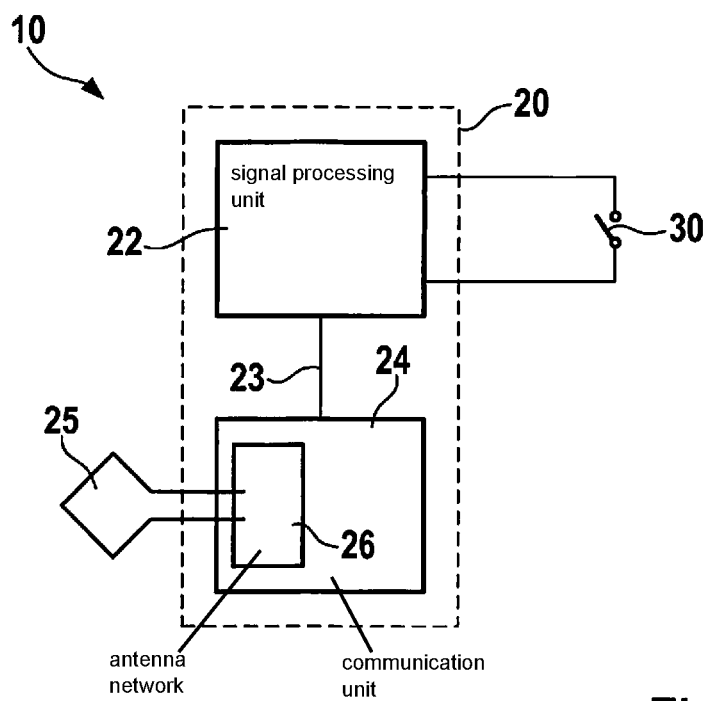
FIG. 2 shows a schematic representation of a second exemplary embodiment of the communication set-up according to the present invention.

As is further discernible from FIG. 1, actuating unit 30 is electrically connected to signal processing unit 22 via communication unit 24. FIG. 2 shows an alternative refinement in the form of a second exemplary embodiment of the present invention, according to which actuating unit 30 is directly connected to signal processing unit 22 electrically. Otherwise, the second exemplary embodiment does not differ from the first exemplary embodiment, so that further descriptions of the second exemplary embodiment are omitted.

In the first exemplary embodiment, actuating unit 30 takes the form of an actuating unit 30 to be manually operated. Thus, it is advantageous that no tool at all, neither a general, nor a special tool, is necessary for operating the actuating unit 30. On the contrary, communication set-up 10 or the bankcard having communication set-up 10 may be used without special precautions. Therefore, it is suitable for wide use in the population.

In FIG. 1, actuating unit 30 takes the form of a switch, in particular, a resistive switch. This specific embodiment provides an option for an actuating unit 30, which is reliable from a technical standpoint, but also easily implemented at the same time.

Actuating unit 30 may be based on different principles. Thus, actuating unit 30 may take the form of an electrical switch, in particular, a membrane key switch. Electrical keys are mostly mechanically operating key switches, in which, in response to their manipulation, electrical contacts are moved. Membrane key switches are suitable for providing dirt- and/or liquid-repellant actuating units 30.

A further option is for an actuating unit 30 to take the form of a nonlocking capacitive switch, in particular, a nonlocking switch to be manipulated via the presence of a finger. Thus, the presence of a finger is detected capacitively. A particularly advantageous specific embodiment of such an actuating unit 30 is a fingerprint sensor. Through this, it is provided that actuating unit 30 or communication set-up 10 ultimately only be able to be activated by a fingerprint of a particular person. The fingerprint acquired by the fingerprint sensor is supplied to signal processing unit 22 as a signal or a plurality of signals in electronic form. For example, signal processing unit 22 takes the form of a processor. The processor compares the acquired fingerprint to one or more fingerprints already stored in digital form, in some instances, after the received signal data have been processed further. Depending on the result of the comparison, signal processing unit 22 may convert communication set-up 20 from the blocked state to the enabled state, that is, unlock it, or keep the blocked state unchanged. Other terms, which are likewise used in connection with fingerprint technology, include a fingerprint scanner or also a Touch ID sensor, which may also be combined to form a new term, e.g., Touch ID fingerprint sensor.

At this juncture, it is noted that the fingerprint technology does not necessarily have to be implemented, using capacitive sensors. Any sensor technology allowing technical acquisition of the fingerprint may be utilized. Thus, for instance, actuating units 30, which use, for example, optical, thermal, electric field, polymeric thin film transistor (TFT), contactless 3-D, ultrasonic, and/or infrared sensors, may be equipped with the fingerprint technology. In particularly advantageous specific embodiments, different sensor types, that is, at least two different sensor types, may be implemented in one communication set-up 10. This increases the reliability, accuracy and/or the rapidity of the acquisition and identification of one or more fingerprints. Depending on need, the different sensor types may be assigned to a common actuating unit 30 or each assigned to actuating units 30 different from each other. In the latter case, communication set-up 10 includes at least two actuating units 30. In one further variant, communication set-up 10 includes at least two actuating units 30, which are each based on the same sensor type.

In addition, communication set-up 10, in particular, actuating unit 10, may include a device for detecting liveness (not shown in the figures) or be at least functionally connected to such a device for detecting liveness. In this connection, the term "at least functionally" means that communication set-up 10, in particular, actuating unit 30, is physically or functionally connected, in this case, to the device for detecting liveness. Thus, communication set-up 20 may communicate, e.g., in a contactless manner, with the device for detecting liveness. The device for detecting liveness is used for determining if, e.g., the fingerprint acquired on actuating unit 30 was produced by a living person or merely by a copy of a fingerprint. Thus, devices for detecting liveness may detect living characteristics, such as pulse, blood circulation, thermal image, or 3-D depth scan. For example, using an IR sensor, it may be determined if dead tissue is present (absorbs IR light readily) or living tissue is present (reflects IR light). On the other hand, the oxygen saturation may be determined with the aid of a capacitive sensor.

Furthermore, besides the fingerprint technology, actuating unit 30 may be provided additionally or alternatively with other biometric authentication technologies, as well. Thus, for example, facial, iris or hand recognition may be used as biometric authentication techniques for operating actuating unit 30. In addition, it is also possible to utilize behavior-based characteristics, such as voice, handwriting, or even keystroke rhythm, on actuating unit 30 as biometric characteristics. In particular specific embodiments, communication set-up 20, in particular, actuating unit 30, may include a plurality of biometric authentication technologies, for instance, identical or also different. Communication set-up 20 may also include non-biometric and biometric techniques for actuating unit 30.

Alternatively, actuating unit 30 may take the form of an actuating unit 30 to be operated mechanically, in particular, automatically or semiautomatically. Thus, the operation of actuating unit 30 may be triggered without manual manipulation, if, for instance, one or more conditions have been checked, with the result that actuating unit 30 should be operated. The check could include, for instance, security-related conditions.

Signal processing unit 22 is suitable for receiving signals and processing them. In this context, simple signals may be processed, but also complex signals may be processed as a function of demand. In the exemplary embodiment according to FIG. 1, signal processing unit 22 takes the form of a microcontroller. In principle, processors may be implemented as signal processing units 22.

Communication unit 10 preferably takes the form of a near field communication (NFC) front end. Alternatively, it may be implemented as a far field communication (FFC) front end. In one particularly high-quality, specific embodiment, communication unit 10 includes both an NFC and an FFC front end. Therefore, communication unit 10 may be used in a flexible manner.

Furthermore, antenna network 26 of communication unit 24 is advantageously suited for communication via an RFID (radio frequency identification), UMTS (universal mobile telecommunications system), WLAN (wireless local area network), GSM (global system for mobile telecommunications) and/or bluetooth interface. This includes the option that antenna network 26 has one of the above-mentioned interfaces.

The communication set-up 10 described also has the advantage that it may be used in various ways for different fields of application. For example, communication set-up 10 may take the form of a card, in particular, a card usable as a means of payment, such as a credit card or bank card, or may be attached to a card. In addition, the card may also take the form of a health insurance card. It is also possible for communication set-up 10 to take the form of an identification document, such as a proof of identity, or be attached to an identification document.

Further areas of practical application are not limited to cards and proofs of identification. Thus, communication set-up 10 may be attached to an electronic device, such as a mobile device, in particular, a cellular phone, tablet computer or PDA (personal digital assistant). In addition, communication set-up 10 may also be attached to a power tool, such as a drill, a household appliance, such as a kitchen appliance, or a traveling device, such as a motor vehicle.

Generally, communication set-up 10 may already be present in a device in integrated form as a component of the device. An example of this is a credit card, which already includes communication set-up 10, for instance, upon its delivery to the consumer. Alternatively, it is possible to add communication set-up 10 at a later time to an original device not having communication set-up 10. In this context, communication set-up 10 may be applied to an outer surface of the device, may be situated in the inner region of the device, or may otherwise be physically or at least functionally connected to the device. In particular, in the case of existing machines, equipment and devices, or even traveling devices, which are intended to be networked, communication set-up 10 may be installed afterwards as a retrofit part.

Owing to the Industry 4.0 concept and IoT (internet of things) technology, networked machines, systems and devices are becoming more and more important, which means that these devices should include communication set-up 10, as well:

Communication set-up 10 of the present invention may also be situated on a machine, that is, a machine may also include communication set-up 10. Such communication set-ups 10, which are equipped with an actuating unit 30 to be operated mechanically, in particular, automatically or semiautomatically, may be used particularly advantageously in machines, in particular, in robots. By way of example, more and more networked machines are being used in the course of the introduction and build-up of the Industry 4.0 concept ("connected industry," "smart factory"). In the manufacturing industry, for instance, production facilities and warehouse systems are increasingly able to independently exchange information, initiate actions and control each other. Machine-to-machine communication (M2M) not only networks manufacturing and delivery operations, but also generates masses of data. In this connection, the machines, which include an actuating unit 30 to be operated mechanically, always advantageously have the option of releasing, or simply not releasing particular data for transmission to other machines as a function of the present situation.

In this context, if the actuating unit 30 to be operated mechanically is an actuating unit 30 to be operated automatically, then the actuating event proceeds without any intervention of people. On the contrary, it is determined, without any action of people, whether or not, and which, data are released for transmission. For this, for example, criteria for and against release of the data may be laid down in advance; the criteria being able to be checked mechanically in the case of data specifically present. Criteria may include, for instance, sensitivity, importance, accuracy, necessity, quantity, type, origin, receiver and/or urgent need of the data to be transmitted. This also contributes towards the machines' not being unnecessarily loaded with the large quantity of data, which are present and also generated in the case of networked machines. Accordingly, uncontrolled and unchecked growth of data is advantageously prevented.

If, however, the actuating unit 30 to be operated mechanically is an actuating unit 30 to be operated semiautomatically, then actuating unit 30 is operated under joint influence of mechanical and manual operations. Thus, for instance, the data to be transmitted could be checked mechanically according to the above-mentioned criteria, but the result of the check must still be confirmed manually, in order that the data is finally released. It is also possible for particular criteria, such as data quantity, to be checked mechanically, and for other criteria, such as sensitivity, to be checked manually.

The above-described technical characteristics for machines are also valid, in particular, for all networked devices, in particular, devices in smart home systems. On one hand, networked devices in smart home systems increase, for example, comfort and energy efficiency. Thus, for instance, by using intelligent building automation, the operation of manufacturing equipment in a building may be designed to be more functional, reliable, safe and energy-efficient. On the other hand, data protection and data integrity have been identified as possible risks of networked devices in smart home systems. In this context, there are threats from both directions of the flow of data: Attacks by hackers against smart home systems could possibly allow harmful data or commands in the form of malware into a networked device. It has already been demonstrated that, in this manner, unauthorized persons were able to, e.g., turn off the electricity or switch off lights in other houses. Serious damage is easy to conceive, when it is theoretically possible for unauthorized persons to manipulate the networked devices. In response to the threatened entry of harmful data, the communication set-up 10 of the present invention provides the option of maintaining a blocked state for incoming data or to convert to the blocked state.

However, the flow of data out of networked devices may also constitute a danger. Data are also collected by the devices in smart home systems. From a technical point of view, these data may easily be transmitted to the suppliers and/or manufacturers of the networked devices or of the smart home system. Inter alia, personal and/or private data could be derived from these data, or these data are already present in the form of personal and/or private data. Using these data, a behavior pattern of the user(s) of the devices could possibly be determined, e.g., when the washing machine is typically used in the household in question, or when the occupants of a house leave their house and return again. Devices and/or smart home systems, which are equipped with the communication set-up 10 of the present invention, now advantageously allow the option of enabling or not enabling the transmission of the data by operation or non-operation of actuating unit 30.

Transport and travel devices, such as motor vehicles, or two-wheeled vehicles, such as e-bikes, which are equipped with communication set-up 10 of the present invention, provide advantages in the handling of the data to be transmitted. The following may be mentioned as examples of situations, in which a road user must identify himself/herself or would like to conduct a payment transaction: the road user would like to pay tolls, pay for gas, and/or pay parking fees. If his/her vehicle is equipped with communication set-up 10 of the present invention, the transmission of the data for identification and/or payment may be enabled by operating the actuating unit 30. In this connection, as described above, actuating unit 30 may be operated manually, automatically or semiautomatically as a function of the specific embodiment. The actuating unit 30 to be operated automatically or semiautomatically is suitable, in particular, in the case of vehicles traveling autonomously or semiautonomously. Thus, the motor vehicles may allow themselves to be identified and/or approve a payment transaction without or with little intervention of the driver, but in some instances, after independent checking of the vehicle. In addition, communication set-up 10 of the present invention is advantageous in vehicles, which are at least partially driven by an electric motor (electric cars or hybrid cars). These vehicles, that is, the traction batteries (drive batteries), must be charged at a charging post or electrical charging station. The contactless communication between the vehicle and the receiver unit of the charging post or electrical charging station, using the communication set-up 10 of the present invention, is advantageous for this. Even more advantageous, is the use in vehicles, whose traction batteries are charged contactlessly. With the contactless power transmission between the battery charger and the traction batteries, wireless communication for the exchange of, or one-sided transmission of, data relevant to charging also occurs. For this, it is sensible to use communication set-up 10 of the present invention. In this context, communication set-up 10 of the present invention may be integrated in the set-up for contactless power transmission and may therefore form a common unit, or may be provided as a communication set-up 10 situated separately on the vehicle and/or battery charger. It is then advantageously coupled, that is, at least functionally connected, to the set-up for contactless power transmission.

In addition, the above-described features regarding contactless charging of batteries may also be used in all other electrical units and devices, for which contactless charging of batteries is possible, and are therefore not limited to transport and travel devices.

The present invention further relates to a method for controlling a communication set-up 10 of the present invention, including the following steps:
a) providing communication set-up 10;
b) operating the actuating unit 30; and
c) converting communication set-up 10 from the blocked state to the enabled state, or vice versa.

The method of the present invention permits simple and, at the same time, reliable use of the communication set-up 10 of the present invention.

What is claimed is:

1. A communication set-up, comprising:
an electronic circuit, the circuit including at least one communication unit configured for wireless communication, the communication unit including an antenna network connected to an antenna; and
an actuating unit;
wherein the circuit further includes a signal processing unit, and in response to operation of the actuating unit, the actuating unit is configured to release a signal to the signal processing unit, which, on the basis of the released signal, converts the communication set-up from a blocked state to an enabled state, or from the enabled state to the blocked state.

2. The communication set-up as recited in claim 1, wherein in response to operation of the actuating unit, the actuating unit is configured to release a signal to the signal processing unit, which, on the basis of the released signal, converts the antenna network, from a blocked state to an enabled state, or vice versa.

3. The communication set-up as recited in claim 1, wherein in response to operation of the actuating unit, the actuating unit is configured to release a signal to the signal processing unit without, in so doing, changing an electrical characteristic of the antenna network.

4. The communication set-up as recited in claim 1, wherein in the blocked state, energy flow and/or data flow is blocked at least to a limited extent, in at least a flow out of the communication set-up.

5. The communication set-up as recited in claim 1, wherein in the enabled state, energy flow and/or data flow is enabled at least to a limited extent, in at least a flow out of the communication set-up.

6. The communication set-up as recited in claim 1, wherein in the enabled state, only a predetermined set of data is released for data flow.

7. The communication set-up as recited in claim 1, wherein the signal processing unit and the communication unit are formed as separate units and interconnected by an electrical line.

8. The communication set-up as recited in claim 1, wherein the signal processing unit and the communication unit are configured as a common unit integrated with each other.

9. The communication set-up as recited in claim 1, wherein the actuating unit is electrically connected to the signal processing unit via the communication unit.

10. The communication set-up as recited in claim 1, wherein the actuating unit is directly connected to the signal processing unit electrically.

11. The communication set-up as recited in claim 1, wherein the actuating unit is a manually operated actuating unit.

12. The communication set-up as recited in claim 11, wherein the actuating unit is a resistive switch.

13. The communication set-up as recited in claim 11, wherein the actuating unit is a membrane key switch.

14. The communication set-up as recited in claim 11, wherein the actuating unit is capacitive key switch operated using a presence of a finger.

15. The communication set-up as recited in claim 11, wherein the actuating unit is formed on the basis of a fingerprint technology, the actuating unit including a fingerprint sensor, or a fingerprint scanner, or a Touch ID sensor.

16. The communication set-up as recited in claim 1, wherein the actuating unit is equipped with a biometric authentication technology on the actuating unit, the biometric authentication technology including face detection, or iris detection, or hand detection, or voice detection, or handwriting detection, or keystroke rhythm.

17. The communication set-up as recited in claim 16, wherein the communication set-up includes a device for detecting liveness or is at least functionally connected to a device for detecting liveness.

18. The communication set-up as recited in claim 1, wherein the communication set-up is a retrofit part for retrofitting an existing device.

19. The communication set-up as recited in claim 1, wherein the actuating unit is a mechanically operated actuating unit.

20. The communication setup as recited in claim 19, wherein the actuating unit is operated automatically or semiautomatically.

21. The communication set-up as recited in claim 20, wherein the communication set-up is integrated in a machine for machine-to-machine communication or is at least functionally connected to a machine for machine-to-machine communication.

22. The communication set-up as recited in claim 1, wherein the signal processing unit is a microcontroller or a processor.

23. The communication set-up as recited in claim 1, wherein the communication unit is a near field communication front end.

24. The communication set-up as recited in claim 1, wherein the communication unit is a far field communication (FFC) front end.

25. The communication set-up as recited in claim 1, wherein the antenna network of the communication unit is configured for communication via an RFID (radio frequency identification) interface, and/oror a UMTS (universal mobile telecommunications system) interface, and/or a WLAN (wireless local area network) interface, and/or a GSM (global system for mobile telecommunications) interface, and/or a Bluetooth interface.

26. The communication set-up as recited in claim 1, wherein the communication set-is in the form of a card usable as a means of payment, or is in the form of an identification document, or is attached to the card, or is attached to the identification document.

27. The communication set-up as recited in claim 26, wherein the communication setup is in the form of a credit card or bank card.

28. The communication set-up as recited in claim 26, wherein the communication setup is in the form of the identification document, the identification document is a proof of identity.

29. The communication set-up as recited in claim 1, wherein the communication set-up is attached to a cell phone, or a tablet computer, or a PDA (personal digital assistant), or a power tool, or a drill, or a household appliance, or a kitchen appliance, or a transport device, or a travel device, or a motor vehicle.

30. The communication set-up as recited in claim 1, wherein the communication set-up is situated in an electrical unit contactless charging of batteries.

31. The communication set-up as recited in claim 1, wherein the communication set-up is integrated in a vehicle traveling autonomously or semiautonomously.

32. A method for controlling a communication set-up, the method comprising:
  a) providing the communication set-up, the communication set[up including an electronic circuit, the circuit including at least one communication unit configured for wireless communication, the communication unit including an antenna network connected to an antenna, and an actuating unit, wherein the circuit further includes a signal processing unit, and in response to operation of the actuating unit, the actuating unit is configured to release a signal to the signal processing unit, which, on the basis of the released signal, converts the communication set-up from a blocked state to an enabled state, or from the enabled state to the blocked state;
  b) operating the actuating unit; and
  c) converting the communication set-up from the blocked state to the enabled state, or from the enabled state to the blocked state.

* * * * *